US012808147B2

(12) United States Patent
Blum et al.

(10) Patent No.: US 12,808,147 B2
(45) Date of Patent: Nov. 24, 2026

(54) MACHINE WITH A PERCEPTION SENSOR SYSTEM THAT INCLUDES MULTIPLE SETS OF ONE OR MORE SENSORS

(71) Applicant: Caterpillar Inc., Peoria, IL (US)

(72) Inventors: Darren Allan Blum, Plainfield, IL (US); Michael Anthony Spielman, Jr., Osseo, MI (US); Shaun D. Currier, Naperville, IL (US); Aleksandar M. Egelja, Naperville, IL (US); Tonglin Shang, Bolingbrook, IL (US); Aleksander Franklin Gust, Orland Park, IL (US); Jeffrey Kent Berry, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 23 days.

(21) Appl. No.: 18/961,975

(22) Filed: Nov. 27, 2024

(65) Prior Publication Data

US 2026/0146405 A1 May 28, 2026

(51) Int. Cl.
*E02F 3/84* (2006.01)
*B25J 9/16* (2006.01)

(52) U.S. Cl.
CPC ............. *E02F 3/847* (2013.01); *B25J 9/1697* (2013.01)

(58) Field of Classification Search
CPC ................................ E02F 3/847; B25J 9/1697
See application file for complete search history.

(56) References Cited

U.S. PATENT DOCUMENTS

| | | | | |
|---|---|---|---|---|
| 7,984,574 | B2 | 7/2011 | Pfohl et al. | |
| 9,131,119 | B2 | 9/2015 | Friend et al. | |
| 10,815,640 | B2 | 10/2020 | Naito | |
| 2015/0352721 | A1* | 12/2015 | Wicks | B25J 9/1664 700/228 |
| 2021/0010225 | A1 | 1/2021 | Seki et al. | |
| 2021/0148089 | A1 | 5/2021 | Lee et al. | |
| 2021/0223400 | A1* | 7/2021 | Park | B60W 40/02 |
| 2021/0349468 | A1* | 11/2021 | Bukhari | G05D 1/242 |

FOREIGN PATENT DOCUMENTS

| | | | |
|---|---|---|---|
| DE | 102018131220 | A1 | 6/2020 |
| KR | 101859229 | B1 | 5/2018 |

* cited by examiner

*Primary Examiner* — Ig T An

(57) ABSTRACT

A controller of a machine may identify that an implement and a linkage of the machine are in a first position. The controller may determine, based on identifying that the implement and the linkage are in the first position, that the implement and the linkage are not blocking a first perception zone that is associated with a first set of one or more sensors of a perception sensor system of the machine. The controller may cause, based on determining that the implement and the linkage are not blocking the first perception zone, first perception data captured by the first set of one or more sensors to be used in association with an automatic control operation.

20 Claims, 10 Drawing Sheets

MACHINE WITH A PERCEPTION SENSOR SYSTEM THAT INCLUDES MULTIPLE SETS OF ONE OR MORE SENSORS

TECHNICAL FIELD

The present disclosure relates generally to a machine and, for example, to a machine with a perception sensor system that includes multiple sets of one or more sensors.

BACKGROUND

To perform a dumping operation, a machine, such as a wheel loader, can use an implement (e.g., a bucket or another implement) to load and to carry a material (e.g., asphalt, debris, dirt, snow, feed, gravel, logs, raw minerals, recycled material, rock, sand, woodchips, or similar material) and to dump the material into a dump target (e.g., another machine, such as a dump truck). The machine can include one or more sensors to detect a distance from the machine to the dump target, such as to enable an automated implement lift operation. For example, as part of the automated lift operation, the machine can use the one or more sensors to identify when the machine is sufficiently near the dump target, and thereby automatically cause the implement to raise to a dumping height to enable an efficient dumping of material from the implement into the dump target (e.g., when the machine reaches the dump target).

However, in many cases, due to a geometry of the implement and a linkage that couples the implement to the machine, a field of view of the one or more sensors can be blocked, which inhibits an ability of the machine to accurately determine a distance to the dump target. In many cases, this can result in the machine unintentionally contacting the dump target, such as due to a miscalculation of a stopping distance or of an implement position with respect to the dump target. This, in turn, causes damage (e.g., dents, cracks, or other types of structural deformations) to the implement and the linkage, the machine, and the dump target. This can impact a performance of, as well as reduce an operable life of, the implement and the linkage, the machine, and the dump target.

The controller of the present disclosure solves one or more of the problems set forth above and/or other problems in the art.

SUMMARY

A machine comprises: an implement and a linkage associated with a front of the machine; a perception sensor system that includes a first set of one or more sensors and a second set of one or more sensors associated with the front of the machine; and a controller configured to: identify that the implement and the linkage are in a first position; determine, based on identifying that the implement and the linkage are in the first position, that the implement and the linkage are not blocking a first perception zone associated with the first set of one or more sensors; and cause, based on determining that the implement and the linkage are not blocking the first perception zone, first perception data captured by the first set of one or more sensors to be used in association with an automatic control operation associated with at least one of the machine or the implement and the linkage.

A controller of a machine includes one or more memories; and one or more processors, coupled to the one or more memories, configured to: identify a field of view of a first set of one or more sensors of a perception sensor system of the machine; cause an implement and a linkage of the machine to move across a range of positions; determine, for each position of the range of positions, whether the implement and the linkage obstruct the field of view; identify a set of one or more positions, of the range of positions, that are associated with the implement and the linkage not obstructing the field of view; and identify a first perception zone of the perception sensor system as being associated with the set of one or more positions.

A method includes identifying, by a controller of a machine, that an implement and a linkage of the machine are in a first position; determining, by the controller and based on identifying that the implement and the linkage are in the first position, that the implement and the linkage are not blocking a first perception zone that is associated with a first set of one or more sensors of a perception sensor system of the machine; and causing, by the controller and based on determining that the implement and the linkage are not blocking the first perception zone, first perception data captured by the first set of one or more sensors to be used in association with an automatic control operation.

DETAILED DESCRIPTION

This disclosure relates to a controller of a machine (e.g., that performs a dumping operation) and is applicable to any machine that is capable of loading and moving material (e.g., from a first location to a second, different location) and/or dumping the material (e.g., into a dump target). For example, the machine may be any machine that performs an operation associated with an industry such as, for example, mining, construction, farming, transportation, or any other industry. As some examples, the machine may be a vehicle, a wheel loader, a backhoe loader, a cold planer, a compactor, a feller buncher, a forest machine, a forwarder, a harvester, an excavator, an industrial loader, a knuckleboom loader, a material handler, a motor grader, a pipelayer, a road reclaimer, a skid steer loader, a tractor, a dozer, a tractor scraper, or other above ground equipment, underground equipment, aerial equipment, or marine equipment.

Figure 1:
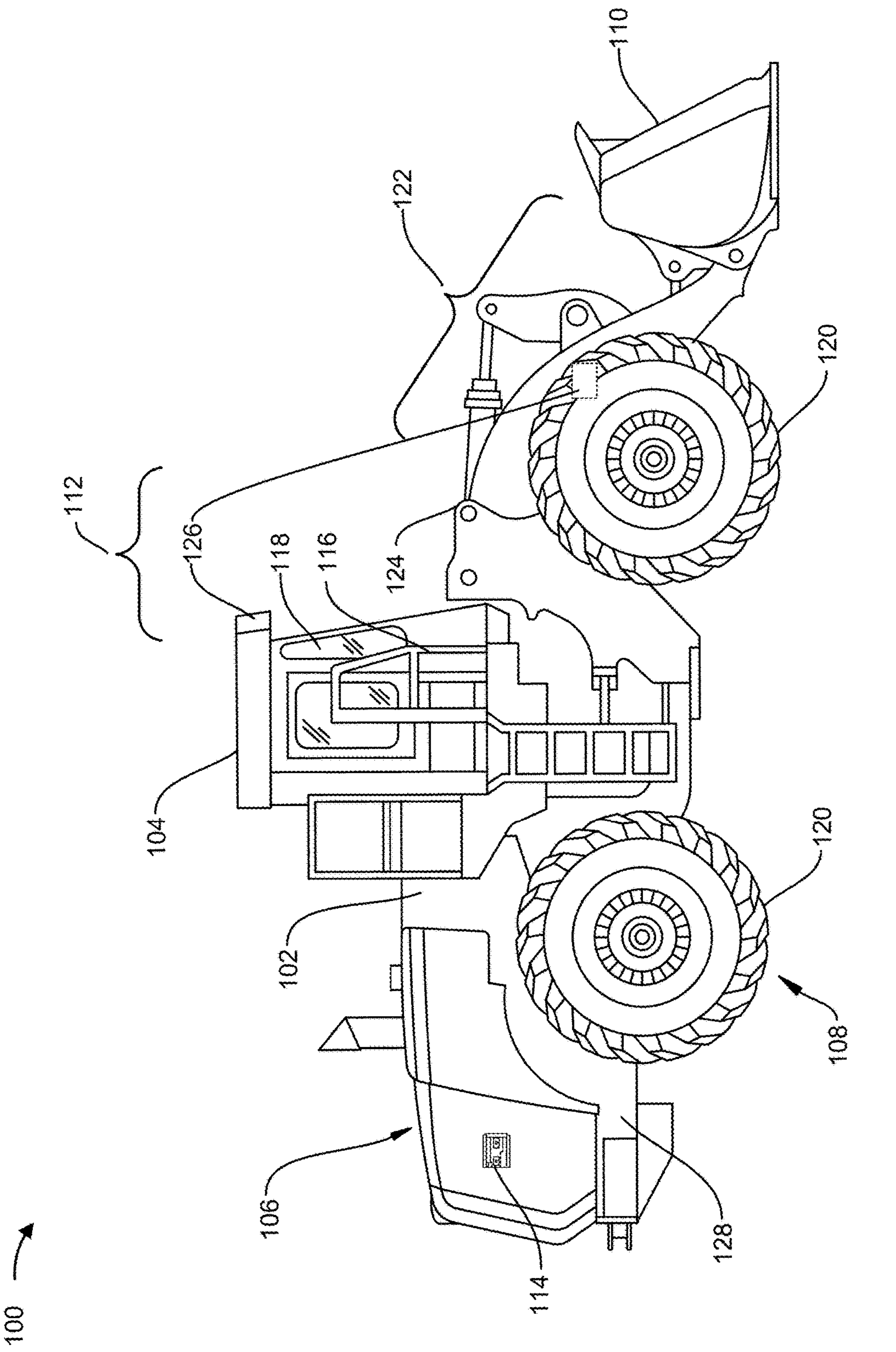
FIG. 1 is a diagram of an example machine described herein.

FIG. 1 is a diagram of an example machine 100 described herein. For example, the machine 100 may include a mobile machine, such as the wheel loader shown in FIG. 1, or any other type of mobile machine. Further, the machine 100 may be a manned machine or an unmanned machine, and/or may be fully autonomous, semi-autonomous, or remotely operated.

As shown, the machine 100 may have a frame 102 that supports an operator station 104, a power system 106, a drive system 108, an implement 110, a perception sensor system 112, and a controller 114. The operator station 104 may include operator controls 116 for operating the machine 100 via the power system 106. In some examples, the machine 100 may not include an operator station 104 and/or operator controls 116 (e.g., the machine 100 may be controlled via other means, such as a remote control system). The operator station 104 may be configured to define an interior cabin 118 within which the operator controls 116 are housed.

The power system 106 is configured to supply power to the machine 100. The power system 106 may be operably arranged to receive control signals from the operator controls 116 in the operator station 104 and/or from the controller 114. Additionally, or alternatively, the power system 106 may be operably arranged with the drive system 108 and/or the implement 110 to selectively operate the drive system 108 and/or the implement 110 according to the control signals. The power system 106 may provide operating power for the propulsion of the drive system 108 and/or the operation of the implement 110. The power system 106 may include an engine, a motor, an electric drive, a fuel cell, and/or another type of power system.

The drive system 108 may be operably arranged with the power system 106 to selectively propel the machine 100 via the control signals. The drive system 108 can include a plurality of ground-engaging members, such as wheels 120, as shown, which can be movably connected to the frame 102 through axles, drive shafts, and/or other components. The drive system 108 may be provided in the form of a track-drive system, a wheel-drive system, or any other type of drive system configured to propel the machine 100.

The implement 110 may be operably arranged with the power system 106 such that the implement 110 is selectively movable through control signals transmitted to the power system 106 from the operator controls 116 and/or the controller 114. As shown in FIG. 1, the implement 110 may be coupled to the machine 100 via a linkage 122, such as at a front 124 of the machine 100. The implement 110 may also be referred to as an attachment, a work tool, a work implement, and/or a tool, among other examples. FIG. 1 depicts implement 110 as a bucket as an example. Other embodiments can include any other suitable implement 110 for a variety of tasks, including, for example, dozing, brushing, compacting, grading, lifting, loading, plowing, and/or ripping, among other examples. Example implements 110 include a stump grinder, a trencher, a broom, a brush cutter, a cold planer, a mower, a mulcher, a processor, a pulverizer, a rake, a saw, a snow product, a snow blower, a tiller, a winch, an auger, a blade, a breaker/hammer, a compactor, a cutter, a forked lifting device, a grader bit and end bit, a grapple, a blade, and/or a ripper, among other examples. As described elsewhere herein, the implement 110 may include one or more components or parts that are electrically powered.

The perception sensor system 112 includes a plurality of sensors 126, which may be coupled to the machine 100, such as at the front 124 of the machine 100. The plurality of sensors 126 may include a sonar sensor, an acoustic sensor, a camera, a light detection and raging (LIDAR) sensor, and/or a radio detection and ranging (RADAR) sensor, or another type of sensor to perceive an environment of the machine 100. That is, the plurality of sensors 126 may include at least one sensor that is configured to capture perception data that can be used (e.g., by the controller 114) to determine at least one of a distance to a target (e.g., a dump target) or a height of the target. The plurality of sensors 126 may also include a location sensor (e.g., a global positioning system (GPS) sensor, or a local positioning system sensor) configured to determine a physical location of the machine 100, a position sensor (e.g., a rotation sensor, or another sensor) configured to detect a position of the implement 110 and the linkage 122, a speed sensor configured to determine a speed of the machine 100 (e.g., when travelling over a surface), and/or one or more other sensors.

The controller 114 may include an electronic control module (ECM) or other computing device. The controller 114 may be configured to cause perception data captured by sets of one or more sensors of the perception sensor system 112 to be used in association with an automatic control operation associated with at least one of the machine 100 or the implement 110 and the linkage 122, cause an automatic perception zone calibration operation to be performed (e.g., in association with the perception sensor system 112), and/or cause one or more other actions to be performed, as further described herein.

A rear portion 128 of the machine 100 may include an engine and a transmission. The engine may be any type of engine suitable for performing work using the machine 100, such as an internal combustion engine, a diesel engine, a gasoline engine, a gaseous fuel-powered engine, and/or the like. In other examples, rather than an engine, the machine 100 may include another power system, such as a motor (e.g., an electric motor), a battery powered system, a fuel cell, or another type of power system. The transmission may transfer power from the engine to the drive system 108 and/or the implement 110.

As indicated above, FIG. 1 is provided as an example. Other examples may differ from what is described in connection with FIG. 1.

Figure 2:
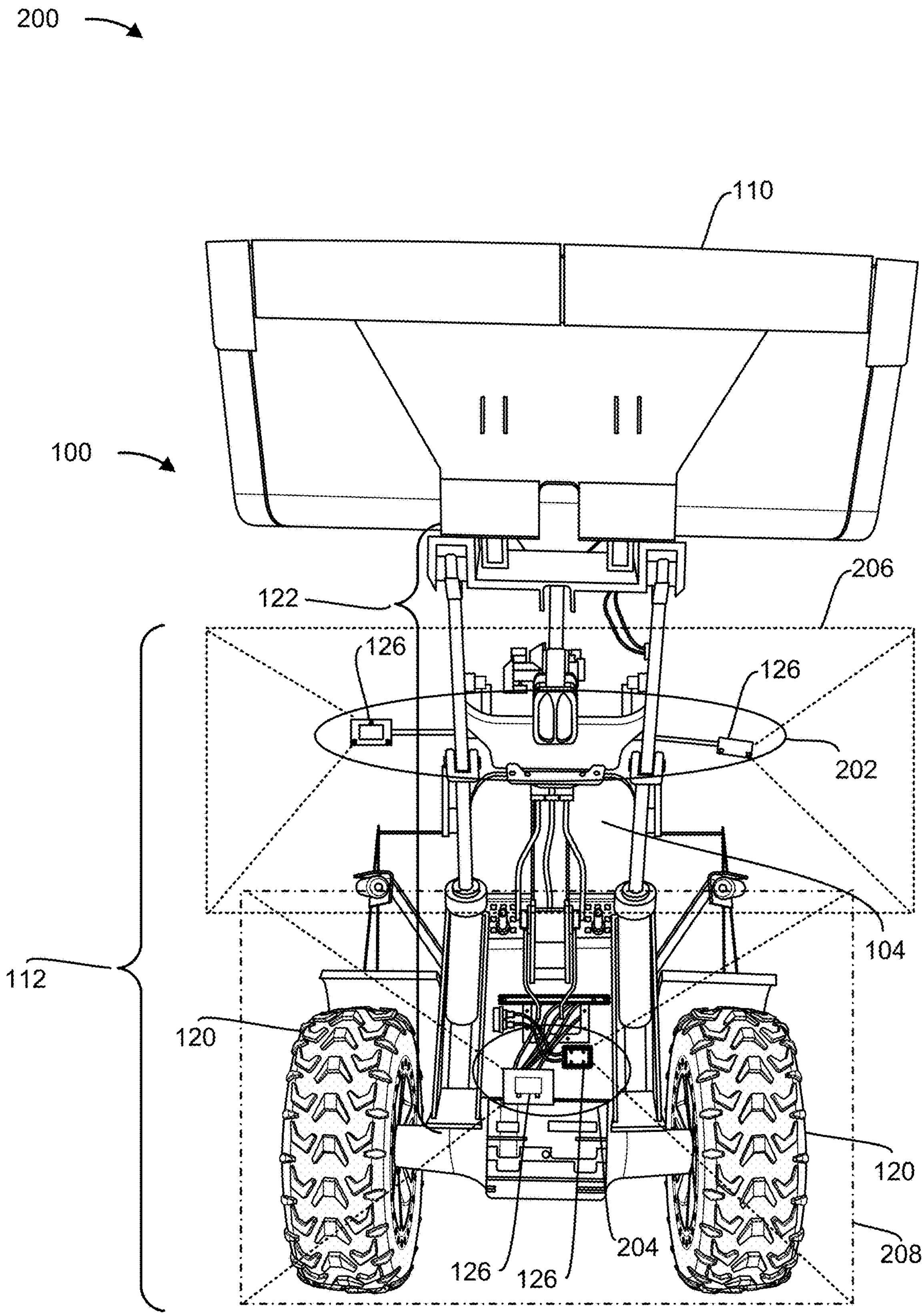
FIG. 2 is a diagram of an example configuration of the front of the machine.

FIG. 2 is a diagram of an example configuration 200 of the front 124 of the machine 100 (e.g., when the implement 110 and the linkage 122 are extended to a "high" position, as further described herein). The perception sensor system 112 may include a plurality of sensors 126 that are allocated into multiple sets of one or more sensors (e.g., that are associated with the front 124 of the machine 100). For example, as shown in FIG. 2, the perception sensor system 112 may include a plurality of sensors 126 that are allocated into a first set of one or more sensors 202 and a second set of one or more sensors 204. The multiple sets of one or more sensors may be positioned at different heights (e.g., on the machine 100, at the front 124 of the machine 100). For example, as shown in FIG. 2, the first set of one or more sensors 202 may be positioned at a first height associated with (e.g., aligned with, or nearly aligned with) a top of the operator station 104, and the second set of one or more sensors 204 may be positioned at a second height associated with (e.g., aligned with, or nearly aligned with) the wheels 120.

A set of one or more sensors may include sensors of different types. For example, the first set of one or more sensors 202 or the second set of one or more sensors 204 may include a first sensor of a first type and a second sensor of second type, where the first type is different than the second type. As a specific example, the first set of one or more sensors 202 may include a RADAR sensor and a camera. By including a RADAR sensor, the first set of one or more sensors 202 may be able to accurately detect a target (e.g., a dump target) at large distances (e.g., distances greater than 6 meters), regardless of lighting conditions encountered by the machine 100 (e.g., whether the machine 100 is operating in full sun, partial sun, no sun, artificial lighting, and/or no artificial lighting) and, by including the camera, the first set of one or more sensors 202 may be able to accurately identify a marker (e.g., a fiducial) that distinguishes the target from another object. As another specific example, the second set of one or more sensors 204 may include a RADAR sensor and a sonar sensor. By including a RADAR sensor, the second set of one or more sensors 204 may be able to accurately detect a target (e.g., a dump target) at large distances (e.g., distances greater than 6 meters) and, by including the sonar sensor, the second set of one or more sensors 204 may be able to accurately detect a target at small distances (e.g., distances less than or equal to 6 meters).

Additionally, or alternatively, a set of one or more sensors may include multiple sensors of a same type. For example, the first set of one or more sensors 202 or the second set of one or more sensors 204 may include a first sensor of a first type and a second sensor of the first type. As a specific example, the first set of one or more sensors 202 may include multiple RADAR sensors (e.g., positioned on either side of the operator station 104). By including the multiple RADAR sensors, a field of view of the first set of one or more sensors 202 may be increased (e.g., broadened in a horizontal direction) and a detection accuracy and precision of the first set of one or more sensors 202 may be improved. As another specific example, the second set of one or more sensors 204 may include multiple sonar sensors, such as positioned in a two-dimensional (e.g., row and column) layout, or in a one-dimensional layout (e.g., a column layout or a row layout). By including the multiple sonar sensors, a field of view of the second set of one or more sensors 204 may be increased (e.g., broadened in a horizontal direction and/or extended in a vertical direction) and a detection accuracy and precision of the second set of one or more sensors 204 may be improved.

Moreover, the perception sensor system 112 may include a plurality of perception zones. A perception zone may be associated with a set of one or more sensors of the multiple sets of one or more sensors. A perception zone may be a portion of a field of view (e.g., an aggregated field of view) of the one or more sensors in which the one or more sensors are able to accurately perceive an environment of the machine 100 (e.g., for particular positions of the implement 110 and the linkage 122). The perception zone may have a three-dimensional shape, such as a cone, a sphere, a rectangular prism, or another type of shape. As a specific example, the perception sensor system 112 may have a first perception zone 206 that is associated with the first set of one or more sensors 202 and may have a second perception zone 208 that is associated with the second set of one or more sensors 204. At least some of the plurality of perception zones may overlap, or, alternatively, the plurality of perception zones may not overlap. Because the multiple sets of one or more sensors may include sensors of different types, each perception zone may be a composite of incongruent but similarly-located individual sensor zones.

As indicated above, FIG. 2 is provided as an example. Other examples may differ from what is described in connection with FIG. 2.

Figure 3A:
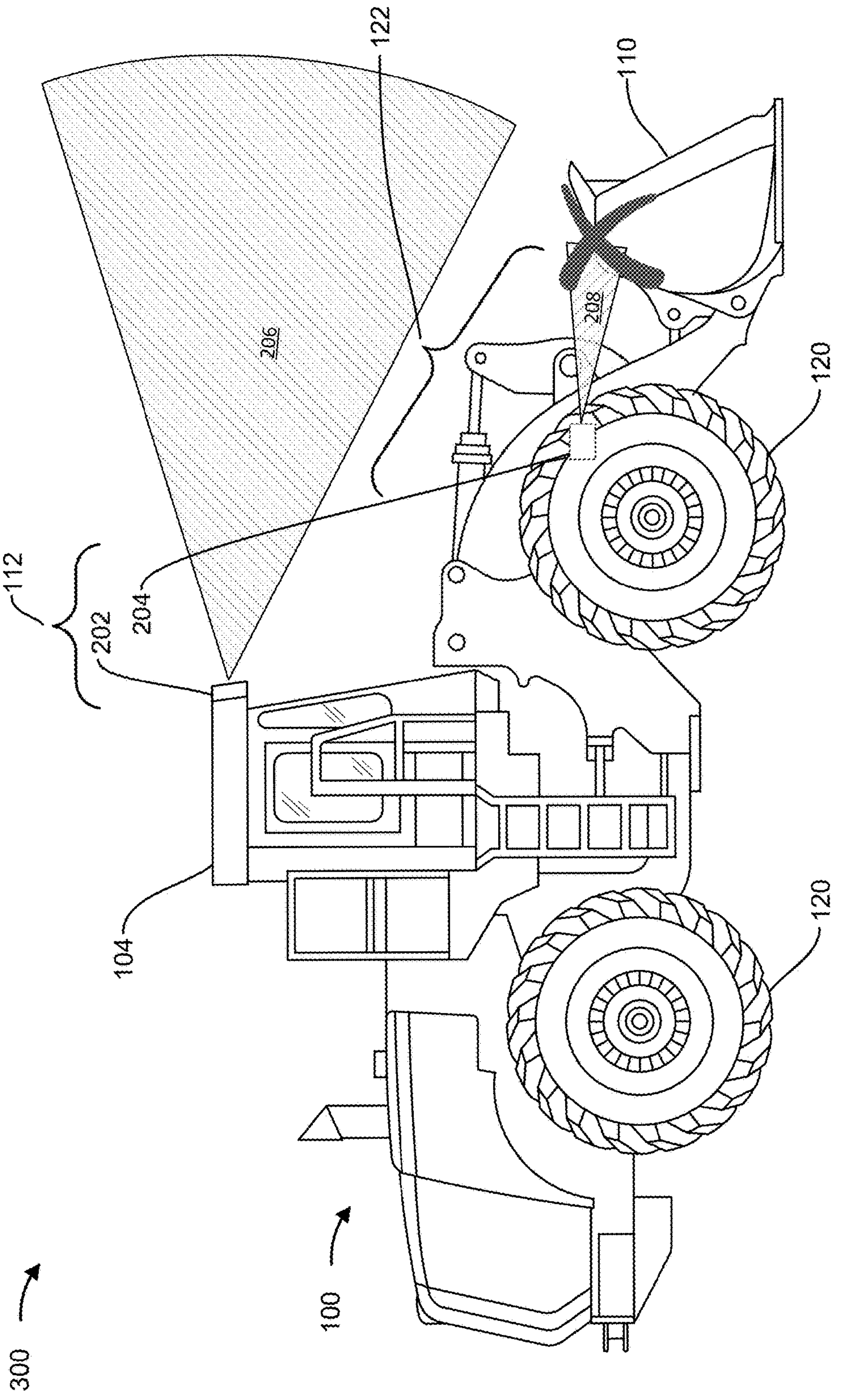
FIGS. 3A-3C are diagrams of an example implementation described herein.
Figure 3B:
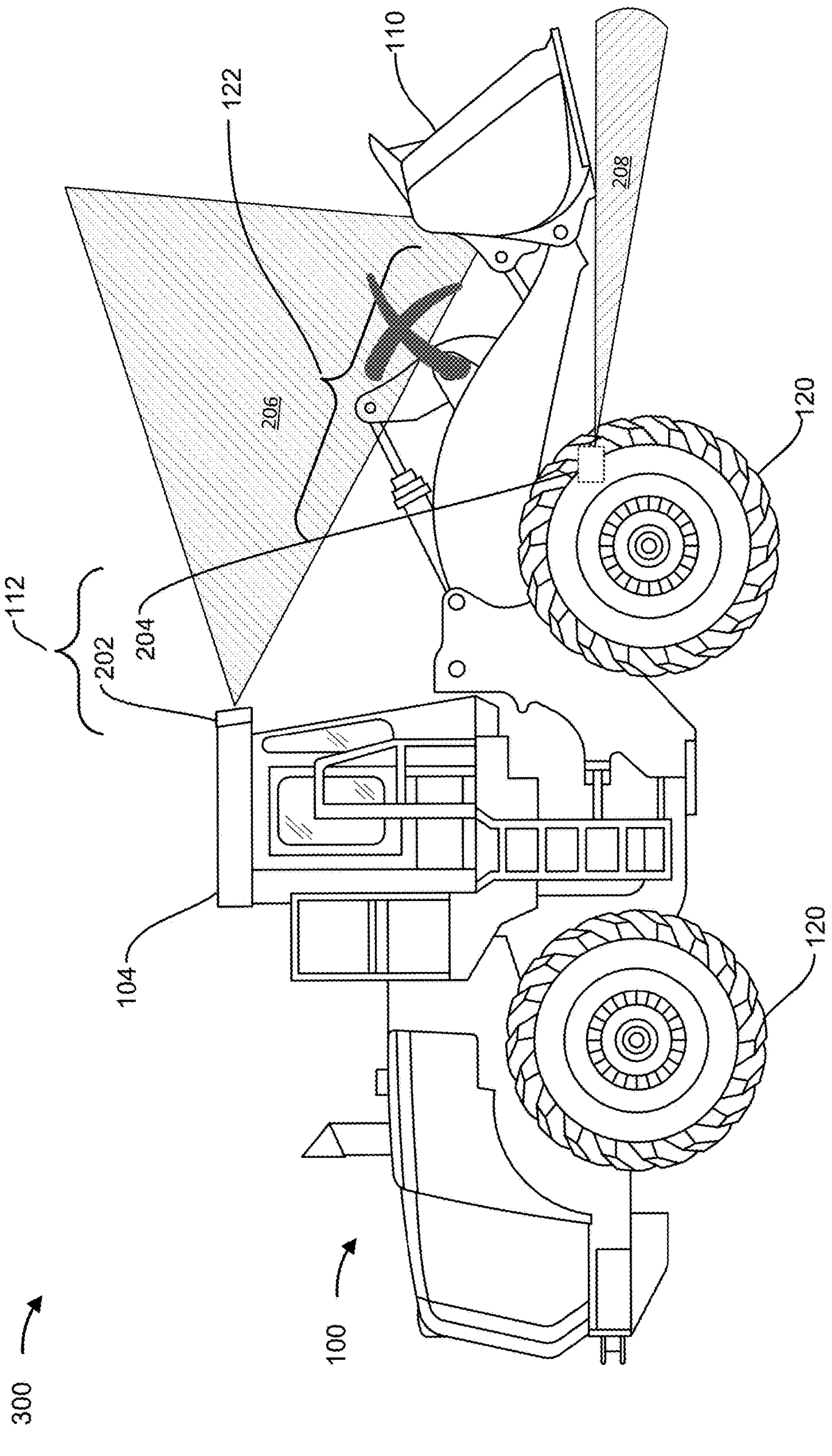
Figure 3C:
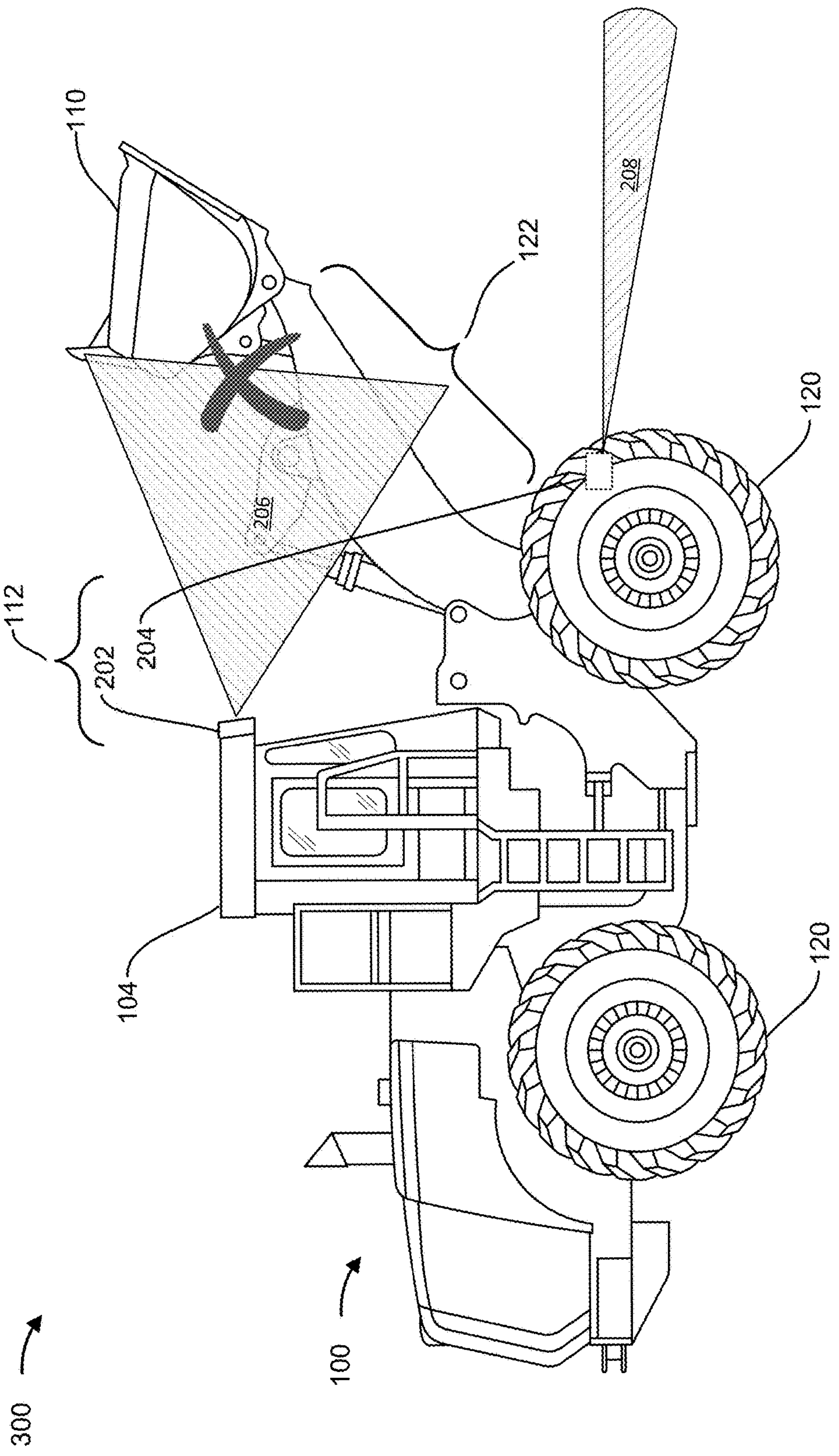

FIGS. 3A-3C are diagrams of an example implementation 300 described herein. FIGS. 3A-3C show side views of the machine 100 when the implement 110 and the linkage 122 are in different positions.

As shown in FIG. 3A, the implement 110 and the linkage 122 may be in a "low" position (e.g., where the implement 110 is aligned with, or nearly aligned with, the wheels 120). As part of an automatic control operation (e.g., that is associated with at least one of the machine 100, or the implement 110 and the linkage 122), the controller 114 may cause the implement 110 and the linkage 122 to be in the low position. For example, as part of the automatic control operation, the controller 114 may cause the implement 110 and the linkage 122 to be in the low position to enable loading and/or carrying of material, such as from a first location to a second location that is associated with a dump target (e.g., another machine, such as a dump truck). As shown in FIG. 3A, when in the low position, the implement 110 and the linkage 122 may not block the first perception zone 206 of the perception sensor system 112 that is associated with the first set of one or more sensors 202, but may block the second perception zone 208 of the perception sensor system 112 that is associated with the second set of one or more sensors 204. Accordingly, the controller 114 may cause first perception data captured by the first set of one or more sensors 202 to be used in association with the automatic control operation (e.g., may allow the first perception data to be used as input for the automatic control operation) and/or may cause second perception data captured by the second set of one or more sensors 204 to not be used in association with the automatic control operation (e.g., may prevent the second perception data from being used as input for the automatic control operation), as further described herein.

As shown in FIG. 3B, the implement 110 and the linkage 122 may be in a "middle" position (e.g., where the implement 110 is aligned with, or nearly aligned with, a bottom of the operator station 104). As part of the automatic control operation, the controller 114 may cause the implement 110 and the linkage 122 to be in the middle position. For example, as part of the automatic control operation, the controller 114 may cause the implement 110 and the linkage 122 to be in the middle position when the machine 100 is sufficiently close to (e.g., within a first threshold distance of) the dump target (e.g., to facilitate an eventual dumping of the material carried by the implement 110). As shown in FIG. 3B, when in the middle position, the implement 110 and the linkage 122 may block the first perception zone 206, but may not block the second perception zone 208. Accordingly, the controller 114 may cause first perception data captured by the first set of one or more sensors 202 to not be used in association with the automatic control operation (e.g., may prevent the first perception data from being used as input for the automatic control operation) and/or may cause second perception data captured by the second set of one or more sensors 204 to be used in association with the automatic control operation (e.g., may allow the second perception data to be used as input for the automatic control operation), as further described herein.

As shown in FIG. 3C, the implement 110 and the linkage 122 may be in a "high" position (e.g., where the implement 110 is aligned with, or nearly aligned with, a top of the operator station 104). As part of the automatic control operation, the controller 114 may cause the implement 110 and the linkage 122 to be in the high position. For example, as part of the automatic control operation, the controller 114 may cause the implement 110 and the linkage 122 to be in the high position when the machine 100 is within a "dumping distance" (e.g., within a second threshold distance, which is less than the first threshold distance) of the dump target (e.g., to facilitate an impending dumping of the material carried by the implement 110). As shown in FIG. 3C, when in the high position, the implement 110 and the linkage 122 may block the first perception zone 206, but may not block the second perception zone 208. Accordingly, the controller 114 may cause first perception data captured by the first set of one or more sensors 202 to not be used in association with the automatic control operation (e.g., may prevent the first perception data from being used as input for the automatic control operation) and/or may cause second perception data captured by the second set of one or more sensors 204 to be used in association with the automatic control operation (e.g., may allow the second perception data to be used as input for the automatic control operation), as further described herein.

While FIGS. 3A-3C shows specific examples of sets of sensors (e.g., positioned at specific heights and locations on the machine 100), of perception zones (e.g., with specific geometries that do not overlap), and of the implement 110 and the linkage 122 blocking or not blocking of the perception zones based on specific positions of the implement 110 and the linkage 122, implementations include any combination of sets of sensors (e.g., positioned at any height and location on the machine 100, of perception zones (e.g., with any type of geometry, whether overlapping or not overlapping with other perception zones), or of the implement 110 and the linkage 122 blocking or not blocking of the perception zones based on any position of the implement 110 and the linkage 122. Accordingly, the controller 114, based on any configuration of a set of one or more sensors, a perception zone associated with the set of one or more sensors, and a position of the implement 110 and the linkage 122 may cause (e.g., selectively cause) perception data captured by the set of one or more sensors to be use, or to not be used, in association with the automatic control operation, as further described herein.

Figure 5A:
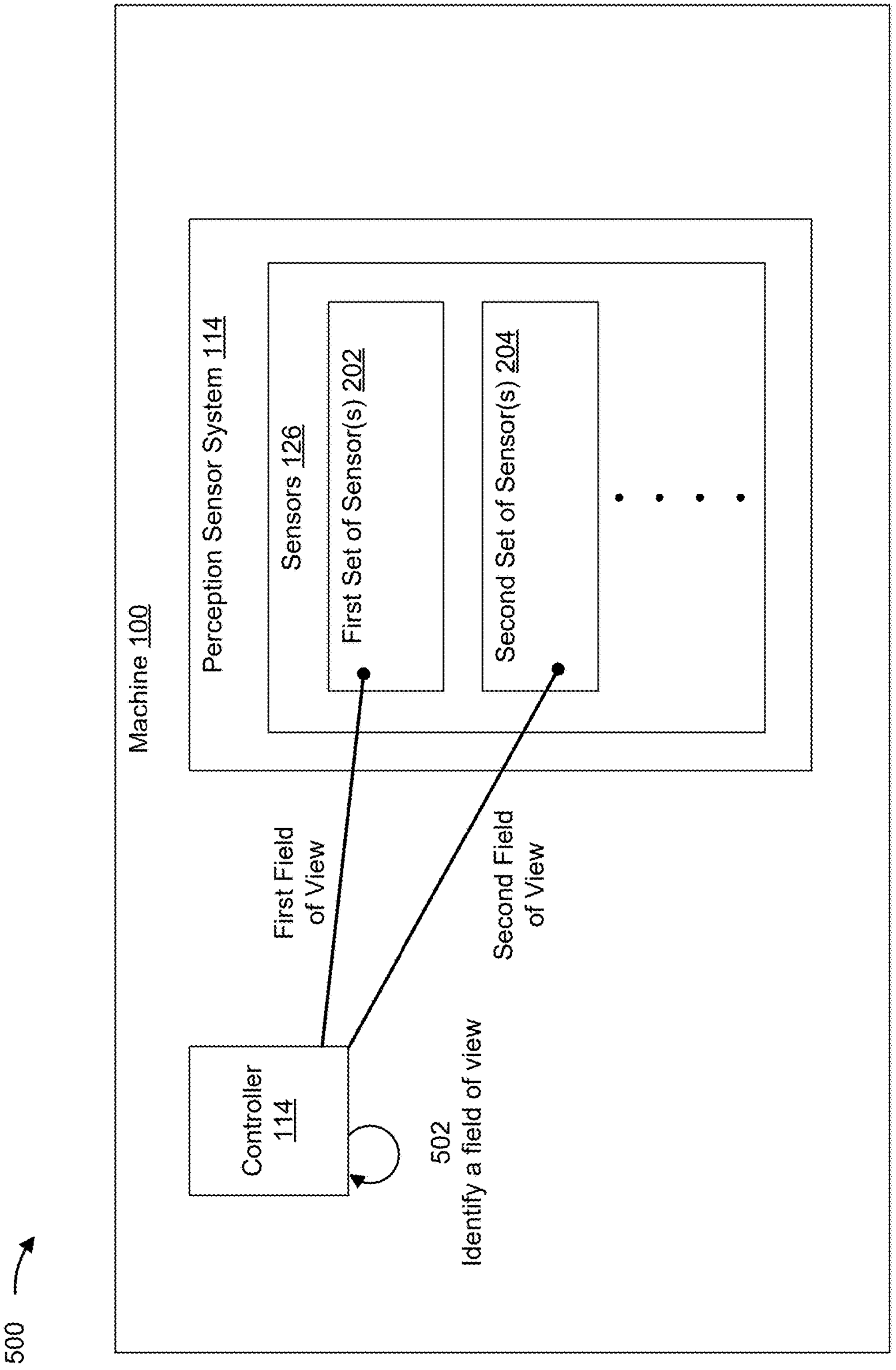
FIGS. 5A-5B are diagrams of an example implementation described herein.
Figure 5B:
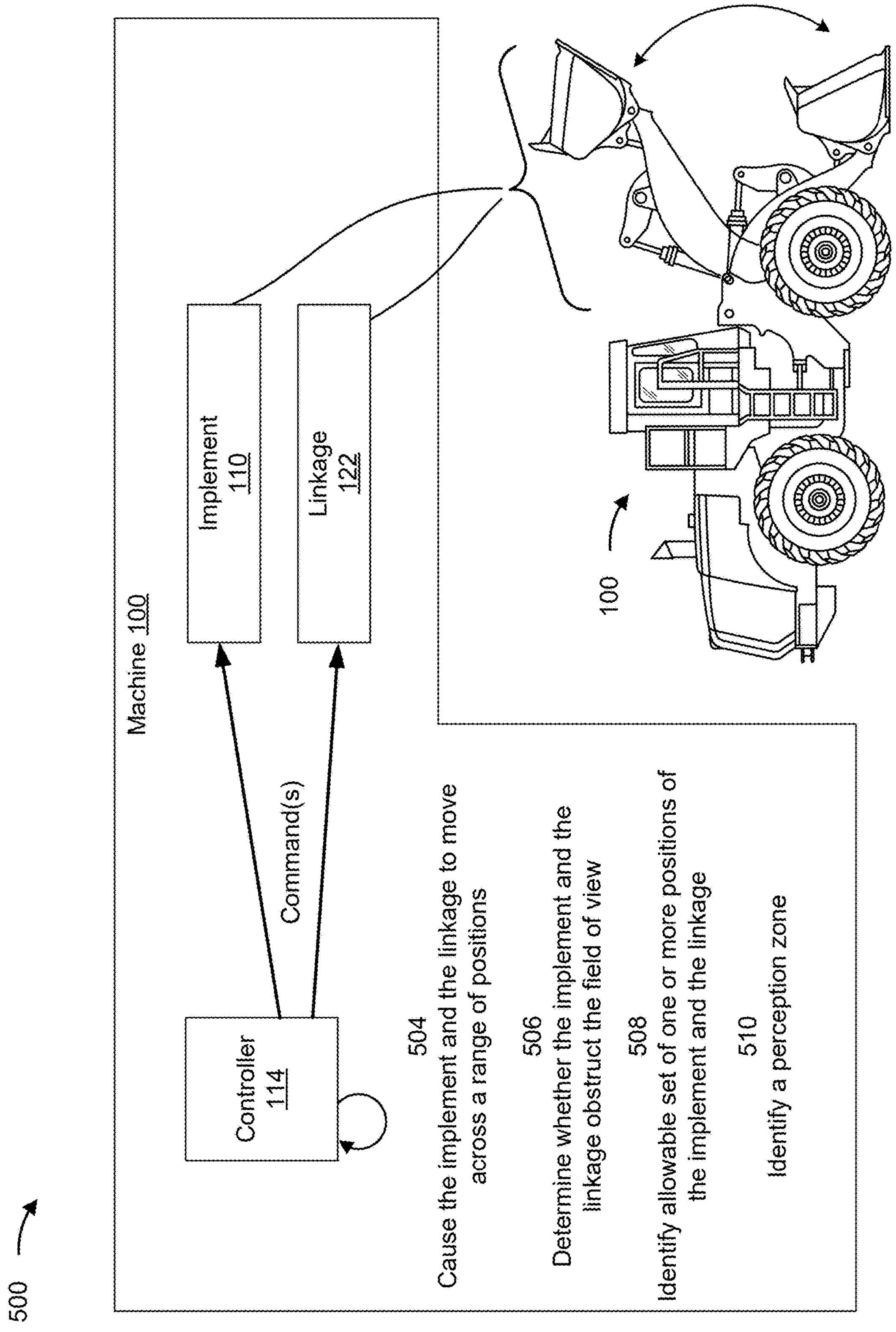

In some implementations, the controller 114 may cause the implement 110 and the linkage 122 to move across a range of positions, such as in association with an automatic perception zone calibration operation, as further described herein in relation to FIGS. 5A-5B. For example, the controller 114 may cause the implement 110 and the linkage 122 to move to the low position, the middle position, the high position, and/or one or more other positions (e.g., in a sweep of the implement 110 and the linkage 122).

As indicated above, FIGS. 3A-3C are provided as an example. Other examples may differ from what is described in connection with FIGS. 3A-3C.

Figure 4A:
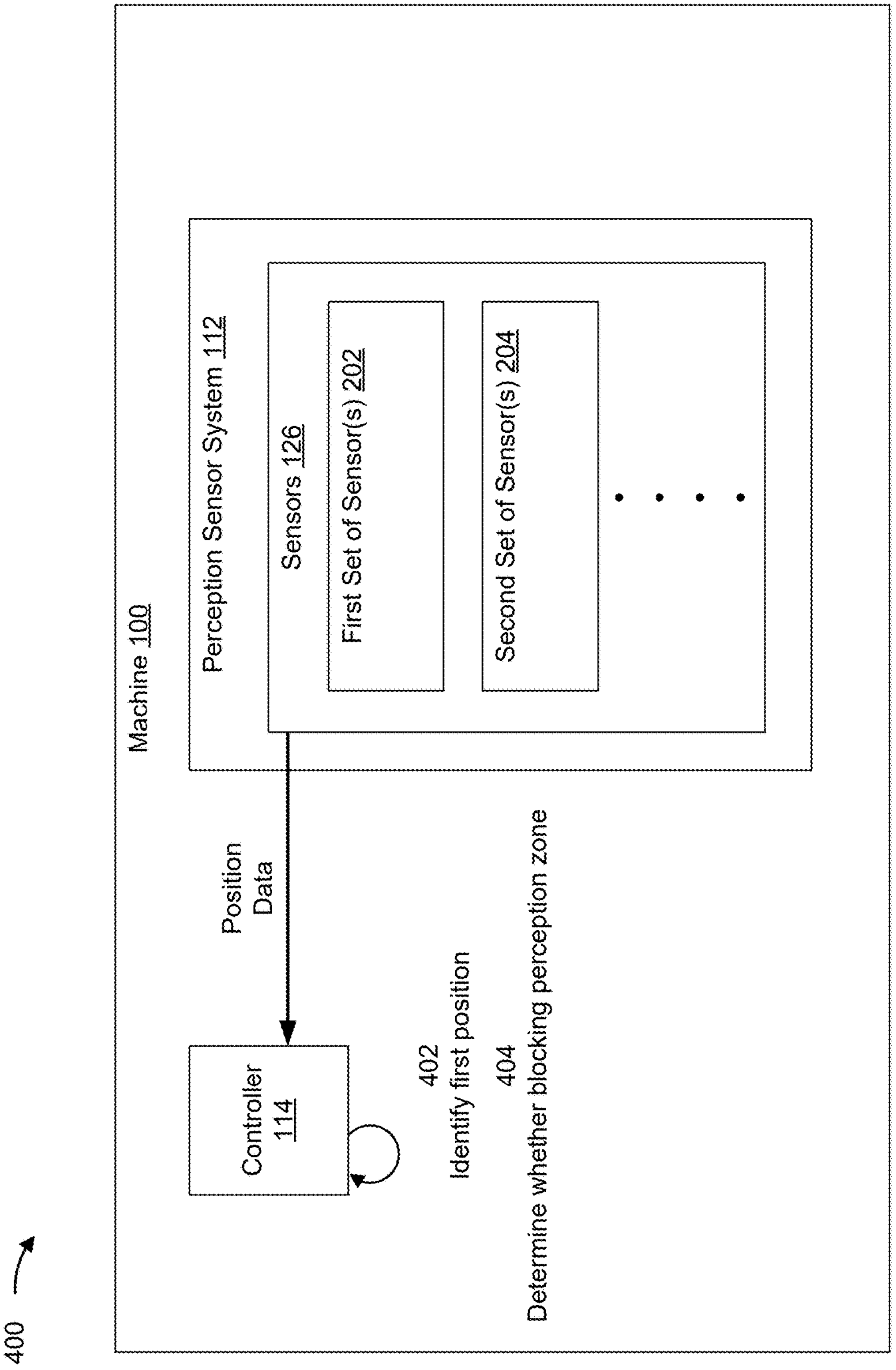
FIGS. 4A-4B are diagrams of an example implementation described herein.
Figure 4B:
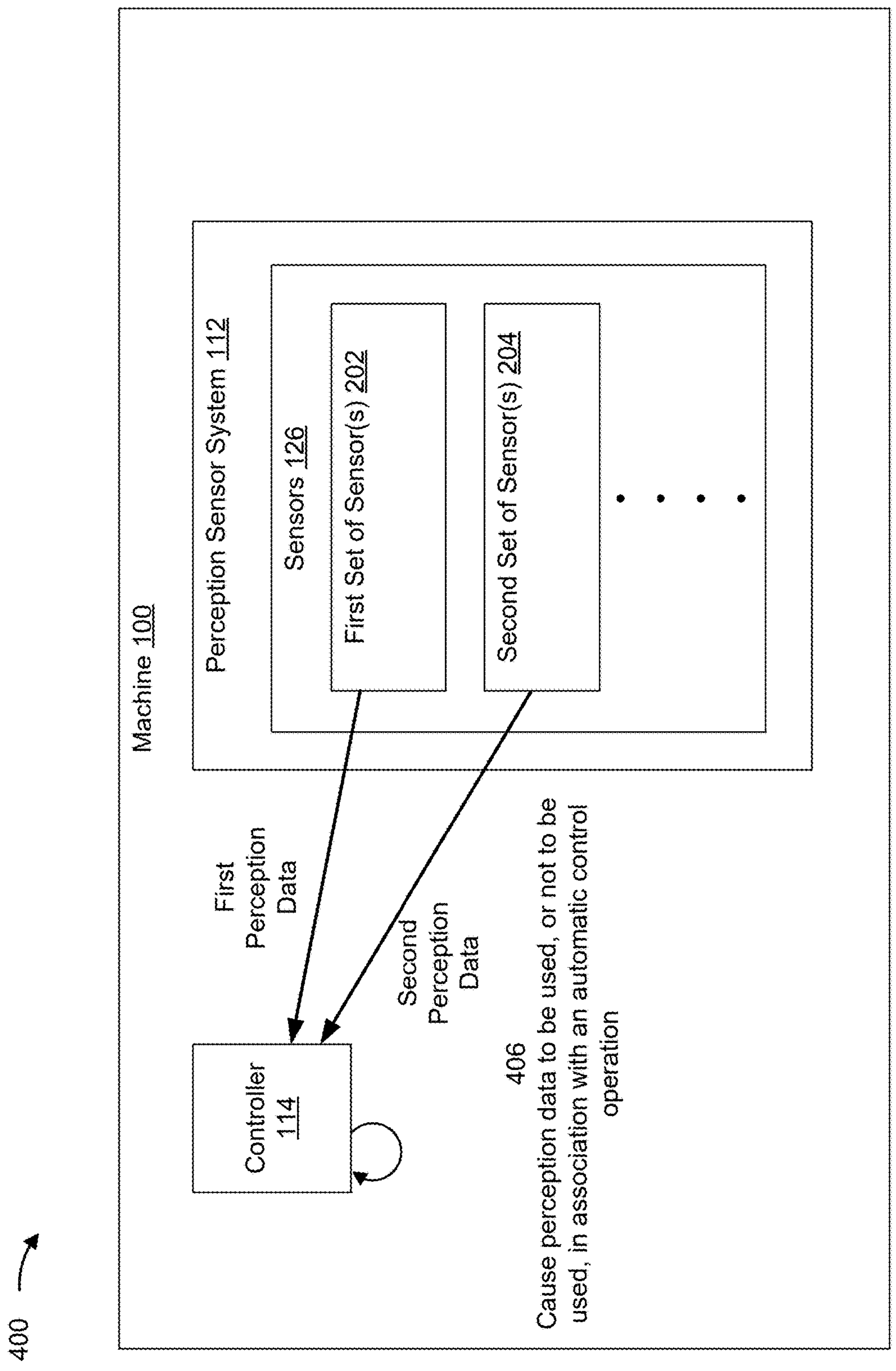

FIGS. 4A-4B are diagrams of an example implementation 400 described herein. FIGS. 4A-4B show how the controller 114 facilitates selection of perception data captured by the plurality of sensors 126 of the perception sensor system 112 for use in association with an automatic control operation (e.g., that is associated with at least one of the machine 100, or the implement 110 and the linkage 122). The automatic control operation may, for example, cause the machine 100 to travel to or from a target (e.g., a dump target) and/or cause the implement 110 and the linkage to move to particular positions (e.g., based on a proximity of the machine 100 to the target).

As shown in FIG. 4A, and by reference number 402, the controller 114 may identify that the implement 110 and the linkage 122 are in a first position. For example, when the plurality of sensors 126 includes a position sensor, the controller 114 may receive position data from the position sensor (e.g., in real time, or near real time) and may process (e.g., parse and/or read, along with other examples) the position data to determine that the implement 110 and the linkage 122 are in the first position. The implement 110 and the linkage 122 may be in the first position, for example, to load and/or carry material, such as from a first location to a second location that is associated with a dump target (e.g., another machine, such as a dump truck). The first position may be, for example, the low position, the middle position, or the high position, described herein in relation to FIGS. 3A-3C, or another position.

As shown by reference number 404, the controller 114 may determine (e.g., based on identifying that the implement 110 and the linkage 122 are in the first position) whether the implement 110 and the linkage 122 are blocking a perception zone associated with a set of one or more sensors of the plurality of sensors 126 of the perception sensor system 112. To determine whether the implement 110 and the linkage 122 are blocking a perception zone, the controller 114 may determine whether the first position is in an allowable set of one or more positions associated with the perception zone (e.g., whether the first position is a member of the allowable set of one or more positions). The controller 114 may determine the allowable set of one or more positions in association with an automatic perception zone calibration operation, as described herein in relation to FIGS. 5A-5B.

When the controller 114 determines that the first position is in the allowable set of one or more positions, the controller 114 may determine that the implement 110 and the linkage 122 are not blocking the perception zone (e.g., that the implement 110 and the linkage 122 are not obstructing the set of one or more sensors associated with the perception zone). When the controller 114 determines that the first position is not in the allowable set of one or more positions, the controller 114 may determine that the implement 110 and the linkage 122 are blocking the perception zone (e.g., that the implement 110 and the linkage 122 are obstructing set of one or more sensors associated with the perception zone).

As an example, with respect to FIG. 3A, the controller 114 may determine, when the first position is the low position, that the implement 110 and the linkage 122 are not blocking the first perception zone 206 that is associated with the first set of one or more sensors 202 and that the implement 110 and the linkage 122 are blocking the second perception zone 208 that is associated with the second set of one or more sensors 204. As another example, with respect to FIGS. 3B-3C, the controller 114 may determine, when the first position is the middle position or the high position, that the implement 110 and the linkage 122 are blocking the first perception zone 206 and that the implement 110 and the linkage 122 are not blocking the second perception zone 208.

As shown in FIG. 4B, and by reference number 408, the controller 114 may cause (e.g., selectively cause) perception data captured by a set of one or more sensors to be used, or to not be used, in association with an automatic control operation (e.g., that is associated with at least one of the machine 100 or the implement 110 and the linkage 122), such as based on determining whether the implement 110 and the linkage 122 are blocking a perception zone associated with the set of one or more sensors. For example, the controller 114 may cause, based on determining that the implement 110 and the linkage 122 are not blocking a perception zone associated with a set of one or more sensors, perception data captured by the set of one or more sensors to be used in association with the automatic control operation (e.g., to allow the perception data to be used as input for the automatic control operation). As an alternative example, the controller 114 may cause, based on determining that the implement 110 and the linkage 122 are blocking a perception zone associated with a set of one or more sensors, perception data captured by the set of one or more sensors to not be used in association with the automatic control operation (e.g., to prevent the perception data from being used as input for the automatic control operation).

As a specific example, with respect to FIG. 3A, the controller 114 may cause, based on determining that the implement 110 and the linkage 122 are not blocking the first perception zone 206 that is associated with the first set of one or more sensors 202, first perception data captured by the first set of one or more sensors 202 to be used in association with the automatic control operation, and may cause, based on determining that the implement 110 and the linkage 122 are blocking the second perception zone 208 that is associated with the second set of one or more sensors 204, second perception data captured by the second set of one or more sensors 204 to not be used in association with the automatic control operation.

In some implementations, the controller 114 may determine that the implement 110 and the linkage 122 are not blocking perception zones associated with multiple sets of one or more sensors of the perception sensor system 112. Accordingly, the controller 114 may cause respective perception data captured by the multiple sets of sensors to be used in association with the automatic control operation. For example, when the first position is a different position than the low position, the middle position, and the high position (e.g., as shown in FIGS. 3A-3C), the controller 114 may determine that the implement 110 and the linkage 122 are not blocking the first perception zone 206 and not blocking the second perception zone 208. The controller 114 then may cause first perception data captured by the first set of one or more sensors 202 and second perception data captured by the second set of one or more sensors 204 to be used in association with the automatic control operation.

The controller 114 may repeatedly perform one or more operations described herein in relation to FIGS. 4A-4B, such as at subsequent time (e.g., after causing particular perception data to be used in association with the automatic control operation). For example, the controller 114 may identify that the implement 110 and the linkage 122 are in a second position (e.g., that is different than the first position), such as in a similar manner as that described herein in relation to reference number 402. The implement 110 and the linkage 122 may be in the second position as a result of causing the particular perception data to be used in association with the automatic control operation (e.g., the automatic control operation, by using the particular perception data, may cause the implement 110 and the linkage 122 to move to the second position).

The controller 114 then may determine (e.g., based on identifying that the implement 110 and the linkage 122 are in the second position) whether the implement 110 and the linkage 122 are blocking a perception zone associated with a set of one or more sensors of the plurality of sensors 126 of the perception sensor system 112, such as in a similar manner as that described herein in relation to reference number 404. Accordingly, the controller 114 may cause (e.g., selectively cause) perception data captured by the set of one or more sensors to be used, or to not be used, in association with the automatic control operation, such as in a similar manner as that described herein in relation to reference number 408.

As an example, with respect to FIGS. 3A-3B, the implement 110 and the linkage 122 may move from the low position (as shown in FIG. 3A) as the first position to the middle position (shown in FIG. 3B) as the second position. Accordingly, at the subsequent time, the controller 114 may determine, when the implement 110 and the linkage 122 are in the second position, that the implement 110 and the linkage 122 are blocking the first perception zone 206 (e.g., that the implement 110 and the linkage 122 are obstructing the first perception zone 206) and that the implement 110 and the linkage 122 are not blocking the second perception zone 208 (e.g., that the implement 110 and the linkage 122 are not obstructing the second perception zone 208). Accordingly, the controller 114 may cause, based on determining that the implement 110 and the linkage 122 are blocking the first perception zone 206, first perception data captured by the first set of one or more sensors 202 to not be used in association with the automatic control operation, and may cause, based on determining that the implement 110 and the linkage 122 are not blocking the second perception zone 208, second perception data captured by the second set of one or more sensors 204 to be used in association with the automatic control operation.

As indicated above, FIGS. 4A-4B are provided as an example. Other examples may differ from what is described in connection with FIGS. 4A-4B.

FIGS. 5A-5B are diagrams of an example implementation 500 described herein. FIGS. 5A-5B show how the controller causes an automatic perception zone calibration operation to be performed, such as to identify a perception zone of the perception sensor system 112 that is associated with a set of one or more sensors. The perception zone may be associated with an allowable set of one or more positions of the implement 110 and the linkage 122, which includes positions of the implement 110 and the linkage 122 that do not, or do not substantially, obstruct a field of view of the set of one or more sensors. The automatic perception zone calibration may be performed prior to the automatic control operation.

As shown in FIG. 5A, and by reference number 502, the controller 114 may identify a field of view of a set of one or more sensors of the perception sensor system 112. For example, the controller 114 may identify a first field of view of the first set of one or more sensors 202 and/or a second field of view of the second set of one or more sensors 204. The controller 114 may identify a field of view of a set of one or more sensors based on configuration information associated with the set of one or more sensors (e.g., that is stored in a data structure that is accessible to the controller 114).

As shown in FIG. 5B, and by reference number 504, the controller 114 may cause the implement 110 and the linkage 122 to move across a range of positions. For example, the controller 114 may cause the implement 110 and the linkage 122 to move to the low position, the middle position, the high position, and/or one or more other positions (e.g., in a sweep of the implement 110 and the linkage 122). The controller 114 may cause the implement 110 and the linkage 122 to move across the range of positions by sending one or more control signals to the power system 106.

As shown by reference number 506, the controller 114 may determine, for each position of the range of positions, whether the implement 110 and the linkage 122 obstruct the field of view of the set of one or more sensors. For example, the controller 114 may cause the set of one or more sensors to capture perception data (e.g., when the implement 110 and the linkage 122 are in each position), and the controller 114 may process (e.g., using one or more analysis techniques) the perception data to determine that the field of view is obstructed by the implement 110 and the linkage 122 (e.g., at least a minimum percentage of the field of view is obstructed), or, alternatively, that the field of view is not obstructed by the implement 110 and the linkage 122.

As shown by reference number 508, the controller 114 may identify an allowable set of one or more positions of the implement 110 and the linkage 122 that are associated with the set of one or more sensors (e.g., based on determining, for each position of the range of positions, whether the implement 110 and the linkage 122 obstruct the field of view of the set of one or more sensors). For example, the controller 114 may identify the allowable set of one or more positions as a set of one or more positions, of the range of positions, that are associated with the implement 110 and the linkage 122 not obstructing the field of view. That is, for a particular position, the controller 114 may determine that the field of view is not obstructed by the implement 110 and the linkage (e.g., may determine all of the field of view is not obstructed, or that less than the minimum percentage of the field of view is obstructed). Accordingly, the controller 114 may identify the particular position as a member of the allowable set of one or more positions.

As shown by reference number 510, the controller 114 may identify a perception zone of the perception sensor system 112 that is associated with the set of one or more sensors as being associated with the allowable set of one or more positions of the implement 110 and the linkage 122. Accordingly, when the implement 110 and the linkage 122 are in a position that is a member of the allowable set of one or more positions, the controller 114 may determine that the implement 110 and the linkage 122 are not blocking the perception zone associated with the set of one or more sensors, as described elsewhere herein. Additionally, when the implement 110 and the linkage 122 are in a position that is not a member of the allowable set of one or more positions, the controller 114 may determine that the implement 110 and the linkage 122 are blocking the perception zone associated with the set of one or more sensors, as described elsewhere herein.

As indicated above, FIGS. 5A-5B are provided as an example. Other examples may differ from what is described in connection with FIGS. 5A-5B.

Figure 6:
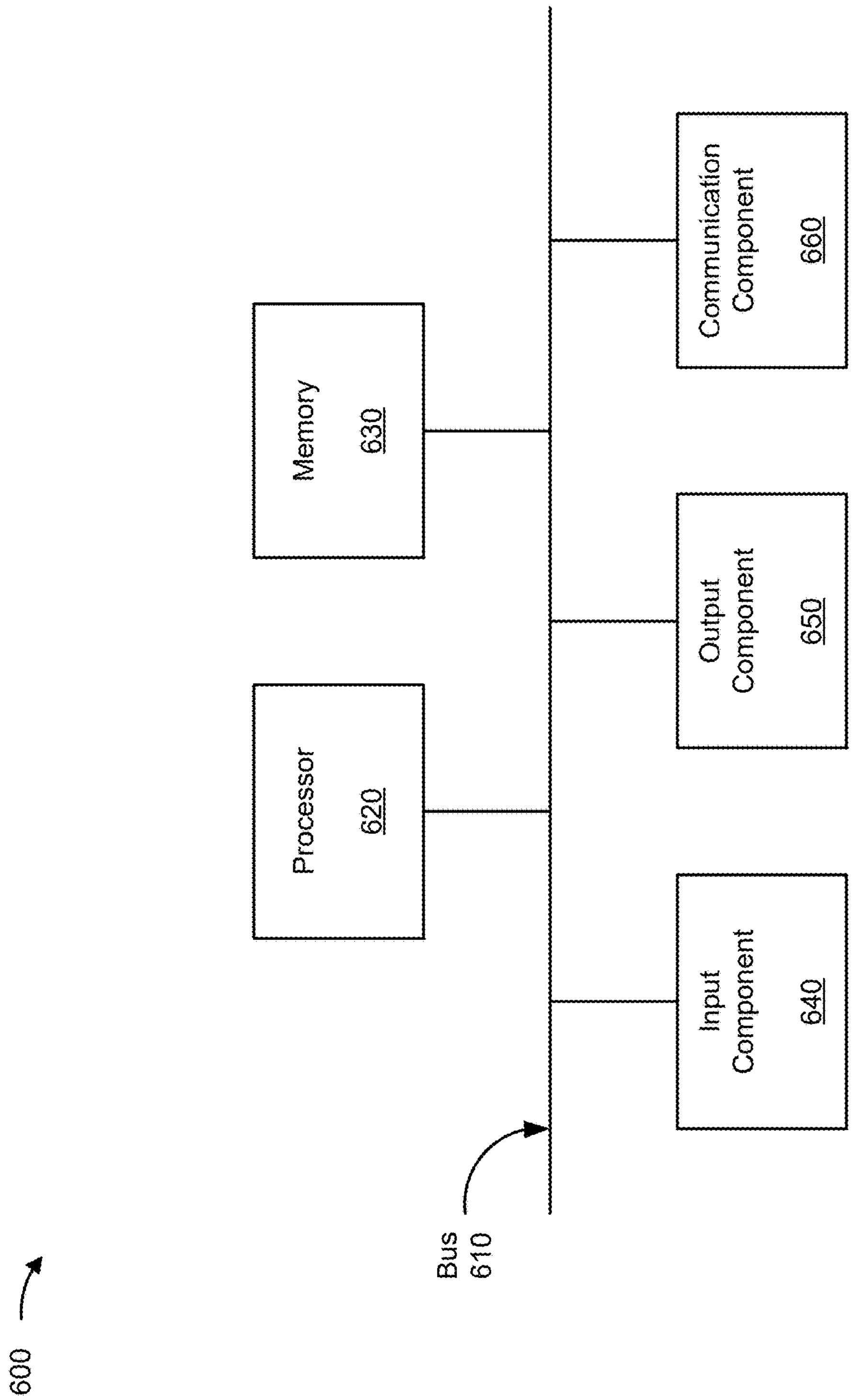
FIG. 6 is a diagram of example components of a device associated with a perception sensor system of a machine.

FIG. 6 is a diagram of example components of a device 600 associated with a perception sensor system of a machine. The device 600 may correspond to the perception sensor system 112, the controller 114, the plurality of sensors 126, the first set of one or more sensors 202, and/or the second set of one or more sensors 204. The perception sensor system 112, the controller 114, the plurality of sensors 126, the first set of one or more sensors 202, and/or the second set of one or more sensors 204 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. The processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. The memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. The execution of the set of instructions, by one or more processors 620, causes the one or more processors 620 and/or the device 600 to perform one or more operations or processes described herein. Hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. A set of components (e.g., one or more components) of the device 600 may perform one or more functions described as being performed by another set of components of the device 600.

INDUSTRIAL APPLICABILITY

Implementations described herein may be used with any machine that includes a controller and a perception sensor system that includes multiple sets of one or more sensors. For example, the disclosed controller (e.g., the controller 114) and the disclosed perception sensor system (e.g., the perception sensor system 112) can be used with any machine that utilizes an implement and linkage, such as a wheel loader that includes an implement and linkage to load, carry, and dump material (e.g., into a dump target).

A machine can include multiple sensors to detect a distance from the machine to a target (e.g., a dump target, such as a dump truck), such as to facilitate an automatic control operation (e.g., that controls a movement of the machine or of an implement and a linkage of the machine, such as in relation to the target). However, in many cases, due to a geometry of the implement and the linkage, a field of view of at least one sensor of the multiple sensors can be blocked. The at least one sensor then captures and passes erroneous perception data to a controller of the machine, which can reduce a likelihood of the controller accurately determining a distance to the target. This can result in the machine unintentionally contacting the target, such as due to a miscalculation of a stopping distance or of an implement position with respect to the target. This, in turn, causes damage (e.g., dents, cracks, or other types of structural deformations) to the implement and the linkage, the machine, and the target, which impacts a performance of, as well as reduces an operable life of, the implement and the linkage, the machine, and the target.

In some implementations described herein, a controller of a machine may cause (e.g., selectively cause) perception data captured by a set of one or more sensors of a perception sensor system of the machine to be used, or to not be used, in association with an automatic control operation. When the machine is a wheel loader, or another similar machine, that includes an implement and linkage (e.g., to load, carry, and dump material, such as into a dump target) the automatic control operation may be associated with the machine (e.g., to cause the machine to travel to or from the dump target) and/or the implement and the linkage (e.g., to cause the implement and linkage to move to particular positions based on a proximity of the machine to the dump target).

For example, the controller may determine that the implement and linkage are in a particular position and then may determine, based on the particular position, whether the implement and the linkage block perception zones of the perception sensor system (wherein each perception zone is associated with a set of one or more sensors of the perception sensor system). When the implement and the linkage block a perception zone, the controller causes perception data captured by a set of one or more sensors associated with the perception zone to be used in association with the automatic control operation. Alternatively, when the implement and the linkage block the perception zone, the controller causes the perception data to not be used in association with the automatic control operation.

In this way, the controller prevents the automatic control operation from utilizing erroneous perception data (e.g., that is captured by a set of one or more sensors that are blocked by the implement and linkage). Thus, the controller, in association with performance of the automatic control operation, is more likely to accurately determine a distance to a target (e.g., a dump target). This thereby reduces a likelihood of the machine unintentionally contacting the target, such as due to a miscalculation of a stopping distance or of an implement and linkage position with respect to the target. Accordingly, in many cases, damage (e.g., dents, cracks, or other types of structural deformations) to the implement and the linkage, the machine, and the target is prevented, which improves a performance of, as well as increases an operable life of, the implement and the linkage, the machine, and the target.

Further, in some implementations the controller causes an automatic perception zone operation to be performed to identify a perception zone of the perception sensor system that is associated with a set of one or more sensors. The perception zone is associated with an allowable set of one or more positions of the implement and the linkage, which includes positions of the implement and the linkage that do not, or do not substantially, obstruct a field of view of the set of one or more sensors. The controller may cause the implement and the linkage to move across a range of positions to identify the allowable set of one or more positions and to therefore identify the perception zone.

In this way, the controller dynamically determines a perception zone of the perception sensor system that is associated with a set of one or more sensors based on practical movement of the implement and the linkage across a range of positions, rather than configuration information associated with the set of one or more sensors. This increases a likelihood that the perception zone is accurately identified given real-world configuration and functioning of the implement and the linkage, as well as the set of one or more sensors. Further, by associating the perception zone with allowable positions of the implement and the linkage, the controller has to process only position data associated with the implement and the linkage to determine whether the implement and linkage block the perception zone, which conserves computing resources (e.g., power resources, memory resources, processing resources, along with other examples) that would otherwise be utilized (e.g., by the controller) to analyze perception data captured by the set of one or more sensors to determine whether the implement and linkage block a field of view of the set of one or more sensors.

What is claimed is:

1. A machine, comprising:

an implement and a linkage associated with a front of the machine;

a perception sensor system that includes a first set of sensors and a second set of sensors associated with the front of the machine; and a controller, configured to:

identify that the implement and the linkage are in a first position;

determine that the first position is included in a stored allowable set of positions, wherein the stored allowable set of positions is associated with:

a first perception zone associated with an unobstructed view of the first set of sensors, and a calibration operation associated with evaluating obstruction of the first perception zone;

cause, based on determining that the first position is included in the stored allowable set of positions, first perception data to be captured by the first set of sensors; and cause, based on the first perception data, an automatic control operation associated with the machine.

2. The machine of claim 1, wherein:

the stored allowable set of positions includes:

a first allowable set of positions associated with the first perception zone, and a second allowable set of positions associated with a second perception zone associated with an unobstructed view of the second set of sensors, the calibration operation is further associated with evaluating obstruction of the second perception zone, and the controller is further configured to:

identify that the implement and the linkage are in a second position;

determine that the second position is included in the second allowable set of positions; and cause, based on determining that the second position is included in the second allowable set of positions, second perception data to be captured by the second set of sensors, wherein the automatic control operation is further based on the second perception data.

3. The machine of claim 1, wherein the controller is further configured to:

determine, based on identifying that the implement and the linkage are in the first position, that the implement and the linkage are not blocking a second perception zone associated with the second set of sensors; and cause, based on determining that the implement and the linkage are not blocking the second perception zone, second perception data to be captured by the second set of sensors, wherein the automatic control operation is further based on the second perception data.

4. The machine of claim 1, wherein the controller is further configured to:

determine, based on the first position of the implement and the linkage, that the implement and the linkage are blocking a second perception zone associated with the second set of sensors; and prevent, based on determining that the implement and the linkage are blocking the second perception zone, second perception data from being captured by the second set of sensors or used in association with the automatic control operation.

5. The machine of claim 1, wherein:

the first set of sensors and the second set of sensors are positioned at different heights.

6. The machine of claim 1, wherein:

the first set of sensors includes a first sensor of a first type and a second sensor of a second type, where the first type is different than the second type.

7. The machine of claim 1, wherein:

the automatic control operation is associated with at least one of a distance to a target or a height of the target.

8. The machine of claim 1, wherein the controller is further configured to:

cause, prior to identifying that the implement and the linkage are in the first position, the calibration operation to be performed.

9. The machine of claim 8, wherein the controller, to cause the calibration operation to be performed, is configured to:

identify a field of view of the first set of sensors;

cause the implement and the linkage to move across a range of positions;

determine, for each position of the range of positions, whether the implement and the linkage obstruct the field of view;

identify the stored allowable set of positions, from the range of positions, that are associated with the implement and the linkage not obstructing the field of view; and identify the first perception zone as being associated with the stored allowable set of positions.

10. A controller of a machine, comprising:

one or more memories; and one or more processors, coupled to the one or more memories, configured to:

identify a field of view of a first set of sensors of a perception sensor system of the machine;

cause, during a calibration operation, an implement and a linkage of the machine to move across a range of positions;

determine, for each position of the range of positions and during the calibration operation, whether the implement and the linkage obstruct the field of view;

identify, during the calibration operation, an allowable set of positions, of the range of positions, that are associated with the implement and the linkage not obstructing the field of view;

identify, during the calibration operation, a first perception zone of the perception sensor system as being associated with the allowable set of positions;

determine, after the calibration operation, that a first position, of the implement and the linkage, is included in the allowable set of positions; and cause, based on determining that the first position of the implement and the linkage is included in the allowable set of positions, an automatic control operation after the calibration operation.

11. The controller of claim 10, wherein the one or more processors are further configured to:

determine that the first position of the implement and the linkage is not blocking the first perception zone; and cause, based on determining that the first position of the implement and the linkage is not blocking the first perception zone, first perception data to be captured by the first set of sensors, wherein the automatic control operation is based on first perception data.

12. The controller of claim 11, wherein the one or more processors are further configured to:

identify that the implement and the linkage are in a second position different from the first position;

determine, based on identifying that the implement and the linkage are in the second position, that the implement and the linkage are not blocking a second perception zone of the perception sensor system that is associated with a second set of sensors; and cause, based on determining that the implement and the linkage are not blocking the second perception zone, second perception data to be captured by the second set of sensors, wherein the automatic control operation is further based on the second perception data.

13. The controller of claim 11, wherein the one or more processors are further configured to:

determine, based on identifying that the implement and the linkage are in the first position, that the implement and the linkage are not blocking a second perception zone that is associated with a second set of sensors of the perception sensor system; and cause, based on determining that the implement and the linkage are not blocking the second perception zone, second perception data to be captured by the second set of sensors, wherein the automatic control operation is further based on the second perception data.

14. The controller of claim 11, wherein the one or more processors are further configured to:

determine, based on identifying that the implement and the linkage are in the first position, that the implement and the linkage are blocking a second perception zone that is associated with a second set of sensors of the perception sensor system; and prevent, based on determining that the implement and the linkage are blocking the second perception zone, second perception data from being captured by the second set of sensors or used in association with the automatic control operation.

15. A method, comprising:

identifying, by a controller of a machine, that an implement and a linkage of the machine are in a first position;

determining, by the controller that the first position is included in a stored allowable set of positions, wherein the stored allowable set of positions is associated with:

a first perception zone associated with an unobstructed view of a first set of sensors of a perception sensor system of the machine, and a calibration operation associated with evaluating obstruction of the first perception zone;

causing, by the controller and based on determining that the first position is included in the stored allowable set of positions, first perception data to be captured by the first set of sensors; and causing, based on the first perception data, an automatic control operation associated with the machine.

16. The method of claim 15, wherein:

the stored allowable set of positions includes:

a first allowable set of positions associated with the first perception zone, and a second allowable set of positions associated with a second perception zone associated with an unobstructed view of the second set of sensors, the calibration operation is further associated with evaluating obstruction of the second perception zone, and the method further comprises:

identifying that the implement and the linkage are in a second position;

determining that the second position is included in the second allowable set of positions; and causing, based on determining that the second position is included in the second allowable set of positions, second perception data to be captured by the second set of sensors, wherein the automatic control operation is further based on the second perception data.

17. The method of claim 15, further comprising:

determining, based on identifying that the implement and the linkage are in the first position, that the implement and the linkage are not blocking a second perception zone that is associated with a second set of sensors of the perception sensor system of the machine; and causing, based on determining that the implement and the linkage are not blocking the second perception zone, second perception data to be captured by the second set of sensors, wherein the automatic control operation is further based on the second perception data.

18. The method of claim 15, further comprising:

determining, based on the first position of the implement and the linkage, that the implement and the linkage are blocking a second perception zone that is associated with a second set of sensors of the perception sensor system of the machine; and preventing, based on determining that the implement and the linkage are blocking the second perception zone, second perception data from being captured by the second set of one or more sensors or used in association with the automatic control operation.

19. The method of claim 15, further comprising:

causing, prior to identifying that the implement and the linkage are in the first position, the calibration operation to be performed.

20. The method of claim 19, wherein causing the calibration operation to be performed comprises:

identifying a field of view of the first set of sensors;

causing the implement and the linkage to move across a range of positions;

identifying the stored allowable set of positions, from the range of positions, that are associated with the implement and the linkage not obstructing the field of view; and identifying the first perception zone as being associated with the stored allowable set of positions.

* * * * *